United States Patent
Vaupel et al.

(10) Patent No.: US 10,436,571 B2
(45) Date of Patent: Oct. 8, 2019

(54) CONFOCAL MICROSCOPE FOR DETERMINATION OF A LAYER THICKNESS AND MICROSCOPY METHOD FOR DETERMINATION OF A LAYER THICKNESS

(71) Applicant: Carl Zeiss Microscopy GmbH, Jena (DE)

(72) Inventors: Matthias Vaupel, Göttingen (DE); Nils Langholz, Apolda (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/042,383

(22) Filed: Jul. 23, 2018

(65) Prior Publication Data

US 2019/0033054 A1  Jan. 31, 2019

(30) Foreign Application Priority Data

Jul. 25, 2017  (DE) .......................... 10 2017 116 745

(51) Int. Cl.
  *G01B 11/06*  (2006.01)
  *G01B 9/02*  (2006.01)
  *G02B 21/00*  (2006.01)

(52) U.S. Cl.
  CPC .......... *G01B 9/02042* (2013.01); *G01B 11/06* (2013.01); *G01B 11/0625* (2013.01); *G01B 11/0675* (2013.01); *G02B 21/008* (2013.01)

(58) Field of Classification Search
  CPC . G01B 11/06; G01B 11/0675; G01B 11/0625; G01B 9/02042
  See application file for complete search history.

(56) References Cited

U.S. PATENT DOCUMENTS

2007/0008551 A1* 1/2007 Tang ................... G01B 11/0675
                                                             356/516
2012/0044501 A1* 2/2012 Oikaze ............... G01B 11/0625
                                                             356/503

FOREIGN PATENT DOCUMENTS

DE   102010016462 B4   7/2015
JP       2005266084      9/2005

OTHER PUBLICATIONS

Kitagawa, K., "Thin Film Thickness Profile Measurement using an Interferometric Surface Profiler," Optomechatronic Sensors and Instrumentation III, SPIE vol. 6717, 2007, 12 pages.

(Continued)

*Primary Examiner* — Jonathan M Hansen
(74) *Attorney, Agent, or Firm* — LaBatt, LLC

(57) ABSTRACT

A confocal microscope for determination of a layer thickness comprises: a focus adjusting device configured to adjust a relative displacement between a focus position of the illumination light and a specimen position along an optical axis, wherein measurement signals belonging to different settings of the focus adjusting device can be recorded; an evaluation device for determining a specimen layer thickness as follows: determine intensity band positions of two intensity bands in a measurement graph recorded by a light measuring device, the measurement graph indicating a light intensity in dependence of the focus position; determine a layer thickness on the basis of a positional difference between the intensity band positions; and determine the layer thickness using a mathematical model which describes for overlapping intensity bands a dependence of the intensity band positions on a light wavelength and the layer thickness, considering interference of the illumination light at the layer.

15 Claims, 5 Drawing Sheets

(56) References Cited

OTHER PUBLICATIONS

Corle, T., et al., "Distance Measurements by Differential Confocal Optical Ranging," Applied Optics, 1987, vol. 26 No. 12, 5 pages.
Cox, G., Sheppard C.J.R., Measurement of Thin Coatings in the Confocal Microscope, Micron 32 (2001) 701-705, 2001, 5 pages.
Jordan., H., et al., "Highly Accurate Non-Contact Characterization of Engineering Surfaces Using Confocal Microscopy," Meas. Sci. Technol. 9 (1998) 1142-1151, 10 pages.
Arwin, H., "Ellipsometry on thin organic layers of biological interest: characterization and applications," Thin Solid Films, 2000, 9 pages.
Fukano, T., et al., "Separation of measurement of the refractive index and the geometrical thickness by use of a wavelength-scanning interferometer with a confocal microscope," Applied Optics, 1999, vol. 38, 9 pages.
Ishigami, M., et al., "Atomic Structure of Graphene on SiO2," Nano Letters 7, 2007, 13 pages.
Li, Meng-Chi, et al., "Application of white-light scanning interferometer on transparent thin-film measurement," Applied Optics, 2012, vol. 51, No. 36, 8 pages.
Papastathopoulos, E., et al., "Chromatic Confocal Spectral Interferometry (CCSI)," Applied Optics, 2006, vol. 45, No. 32, 9 pages.
Sung, L-P., et al., "Use of Laser Scanning Confocal Microscopy for Characterizing Changes in Film Thickness and Local Surface Morphology of UV-Exposed Polymer Coatings," JCT Research, 2004, vol. 1 No. 4, 10 pages.
German Application No. DE1020171167455, Search Report (with partial machine translation), dated Jul. 25, 2017, 11 pages.
Sheppard et al., "Confocal imaging of a stratified medium," Feb. 1, 1994, Applied Optics, vol. 33, No. 4, pp. 631-640.

\* cited by examiner

CONFOCAL MICROSCOPE FOR DETERMINATION OF A LAYER THICKNESS AND MICROSCOPY METHOD FOR DETERMINATION OF A LAYER THICKNESS

The current application claims priority to German Patent Application No. 102017116745.5, filed on 25 Jul. 2017, which is hereby incorporated by reference.

The present invention relates in a first aspect to a confocal microscope for determination of a layer thickness according to the preamble to claim 1.

In a second aspect the invention relates to a microscopy method for determination of a layer thickness according to the preamble to claim 14.

For determination of a layer thickness of microscopic specimens, different methods are known, in particular white light interference microscopy/white light spectroscopy, ellipsometry and confocal microscopy.

A confocal microscope uses a diaphragm (pinhole) for illuminating a specimen and for detection of light coming from the specimen. The pinhole may be arranged in a plane that is conjugated to the focus (i.e., an image plane) so that substantially only light from an illuminated plane but hardly any light from other height layers reaches a light measuring device arranged behind the pinhole. This leads to a good z resolution, i.e., along the optical axis.

A generic confocal microscope for determination of a layer thickness, on which the present invention is based, may comprise a light source for emitting illumination light; alternatively, a mechanical adapter for connecting with a light source may be provided. The generic confocal microscope comprises optical components for guiding and focusing illumination light onto a specimen. The generic confocal microscope furthermore comprises a focus adjusting device which is configured to adjust a relative displacement between a focus position of the illumination light and a specimen position along an optical axis of the confocal microscope. To this end the specimen, an objective or another component of the optical components may be moved/displaced in a height direction, or one of the optical components may be adjusted, for example a zoom setting of zoom optics. The confocal microscope furthermore comprises a light measuring device which is arranged for confocal measurement of illumination light coming from the specimen, wherein measurement signals belonging to different settings of the focus adjusting device can be recorded with the light measuring device. The confocal measurement may be implemented in particular with a pinhole in the beam path between the specimen and the light measuring device. By recording measurement signals for different settings of the focus adjusting device, a light intensity is recorded in dependence on the z focus position.

The measured light intensity has a maximum or extremum if the z focus position falls just on one of the two layer surfaces, i.e., the upper side or the lower side of a layer (for example an interface substrate-layer and an interface layer-air). The distance between these two measured peaks/bands is characteristic of the layer thickness. Thus, the generic confocal microscope comprises an evaluation device for determining a layer thickness of the specimen, to which purpose the evaluation device is configured to:

determine intensity band positions of at least two intensity bands in a measurement graph recorded by the light measuring device, the measurement graph indicating a measured light intensity in dependence of the focus position, and derive a layer thickness on the basis of a positional difference between the intensity band positions.

Similarly, a generic microscopy method for determination of a layer thickness with a confocal microscope comprises the following steps:

guiding illumination light via optical components to a specimen;

adjusting a focus position of the illumination light relative to a specimen position along an optical axis of the confocal microscope by means of a focus adjusting device;

confocally measuring illumination light coming from the specimen by means of a light measuring device, wherein the light measuring device records measurement signals for different settings of the focus adjusting device;

determining a layer thickness (d) of the specimen by means of an evaluation device, to which end the evaluation device determines intensity band positions of at least two intensity bands from a measurement graph recorded with the light measuring device, wherein the measurement graph indicates a measured light intensity in dependence on the focus position, and wherein the evaluation device derives a layer thickness on the basis of a positional difference between the intensity band positions.

Such a measurement graph as recorded with a generic confocal microscope is shown in FIG. 2 of "Use of Laser Scanning Confocal Microscopy for Characterizing Changes in Film Thickness and Local Surface Morphology of UV-Exposed Polymer Coatings" by Li-Piin Sung et al., JCT Research, Vol. 1, No. 4, October 2004.

With a generic confocal microscope, layer thicknesses of several micrometers or more can be measured quite precisely. In the above-mentioned article by Li-Piin Sung et al., the layer thickness is larger than 4 µm in which case the two intensity bands are clearly separated from each other. Most thin layers/thin films with a layer thickness below 2 µm, however, cannot be precisely and easily measured with known confocal microscopy methods. One reason is that the two measured intensity bands overlap each other strongly and known evaluation methods of the positions of overlapping intensity bands lead to incorrect results.

A common variant of known confocal microscopes for determination of a layer thickness makes use of a chromatic longitudinal aberration of the used objectives for analyzing different height layers (z positions). In this way the objective focuses light onto different z positions in dependence on the light wavelength.

Up to know, other measurement techniques than the pure confocal microscopy are used for thickness measurements of thin layers, for example white light interferometry. A white light interferometer for measuring thin layers is, for example, described in "Application of white-light scanning interferometer on transparent thin-film measurement" by Meng-Chi Li et al. in APPLIED OPTICS, 20 Dec. 2012/Vol. 51, No. 36.

Furthermore, variants of confocal microscopes are employed which use the principles of white light interferometers. Such systems may be designed as chromatic confocal interferometers, as described in "Chromatic confocal spectral interferometry" by Evangelos Papastathopoulos et al., APPLIED OPTICS/Vol. 45, No. 32/10 Nov. 2006. In this case white light or light of different wavelengths is guided onto the specimen, wherein an optical component with chromatic longitudinal aberration is used; then a diagram of the measured light intensity in dependence on the wavelength is analyzed to determine the layer thickness. A similar combination of a confocal microscope with an interferometer is known from "Separation of measurement of the refractive index and the geometrical thickness by use of a wavelength-scanning interferometer with a confocal microscope" by T. Fukano et al., 1 Jul. 1999/Vol. 38, No. 19/APPLIED OPTICS and also from DE 10 2010 016 462 B4. In DE 10 2010 016 462 B4 a light intensity maximum is determined in dependence on the wavelength used (FIG. 6 of the referenced patent publication). Then the light intensity maxima are plotted against the wavelength (curve 203 in FIG. 7). By determining the wavelength of the maximum of the curve 203, the distance/the profile of the examined thin layer can be deduced; whereas the wavelength difference 212 between two maxima of the curve 203 yields the layer thickness.

Furthermore, combinational methods are known for examining thin films, such as a combination of AFM (Atomic Force Microscopy) and STM (Scanning Tunneling Microscopy), described in "Atomic Structure of Graphene on $SiO_2$," by Masa Ishigami et al. in Nano Letters 7, 1643 (2007). Also the ellipsometry is widely used, cf. for example "Ellipsometry on thin organic layers of biological interest: characterization and applications" by Hans Arwin, Thin Solid Films 377-378 (2000) 48-56.

It may be regarded an object of the invention to provide a confocal microscope in which thin layers can be examined particularly precisely in a simple way. Furthermore, a corresponding microscopy method for determination of a layer thickness shall be provided.

This object is achieved with the confocal microscope having the features of claim 1 and with the microscopy method comprising the features of claim 14.

Advantageous variants of the confocal microscope of the invention and of the microscopy method of the invention are subject-matter of the dependent claims and are also illuminated in the following description.

The invention is based on the finding that, in a measurement graph showing the light intensity in dependence on the z focus position, two overlapping intensity bands are not merely the sum of the individual two intensity bands which are caused by the two edges/surfaces of a layer. This would only be the case for non-overlapping intensity bands. In the case of overlapping intensity bands, interference plays an important role: In reflection measurements, light that is reflected at a layer upper edge interferes with light passing through the layer and being reflected at a layer lower edge.

In transmission measurements, light that passes the layer without being reflected interferes with light that is reflected at a lower edge and is then reflected at an upper edge of the layer. Furthermore, also multiple reflections may contribute to the interference. It was realized that interference affects the positions of the two overlapping intensity bands. The positional difference between the two intensity band maxima thus does not indicate the correct layer thickness in the case of overlapping intensity bands. According to the invention, it is thus taken into consideration how the intensity band positions are shifted due to interference.

In the confocal microscope of the above-referenced kind, according to the invention the evaluation device is configured to determine the layer thickness using a mathematical model which determines, for overlapping intensity bands, a dependence of the intensity band positions on at least a light wavelength and the layer thickness, considering interference of the illumination light at the layer.

Similarly, according to the invention, a generic microscopy method comprises the step of determining the layer thickness using a mathematical model by means of the evaluation device. The model describes for overlapping intensity bands a dependence of the intensity band positions on at least a light wavelength and the layer thickness under consideration of interference of the illumination light at the layer.

The layer thickness may be the optical thickness of the examined layer which corresponds to the geometrical thickness multiplied with the index of refraction.

In reflection measurements, the mathematical model may consider how a measured light intensity stems from light reflected at an upper edge of a layer as well as light reflected at a lower edge of the layer. Also, interference between these two reflected light portions is taken into consideration. Furthermore, multiple reflections within the layer may be taken into consideration. For the mathematical description of the interference, the light wavelength and the layer thickness may be part of the model. By determining the intensity band positions of the boundary surfaces/interfaces between layer and substrate, the layer thickness can be deduced. In case of overlapping intensity bands, a challenge resides in determination of the intensity band positions and in deriving a layer thickness. If the intensity band of the film (i.e., the layer) is, for example, distanced from the intensity band of the substrate by 0.7 µm, then not 0.7 µm is output as the layer thickness, but the mathematical model rather considers how a distance between the two intensity band positions depends on the layer thickness at the present light wavelength and in particular considering further factors such as the numerical aperture. Furthermore, prior knowledge, for example an expected range of possible layer thicknesses, may be used in the mathematical model to rule out possible ambiguities. As a result, in the case of a distance of, e.g., 0.7 µm between positions of overlapping intensity bands of layer and substrate, the actual layer thickness may be determined to be 0.5 µm.

Determining an intensity band position may be carried out in different ways. How it is determined also affects how much the distance between intensity band positions varies from the actual layer thickness, which can be taken into consideration in the mathematical model. The evaluation device may be configured to determine a respective intensity band position for each of several intensity bands from a recorded measurement graph which plots a measured light intensity in dependence of the focus position, to which end a geometrical center of gravity is calculated from all data within a full width at half maximum of the respective intensity band. That means, in this case at first a maximum value of an intensity band is determined. Then the full width at half maximum is determined, i.e., the band width at a height corresponding to half of the maximum value of this intensity band. From all values within the full width at half maximum, an average is calculated, for example, the median or a geometrical center of gravity/arithmetic mean, wherein the location positions are weighted with the corresponding intensity value. The position determined in this way is used as the intensity band position. Alternatively, simply the position value at which the intensity band has its maximum value may be used as the intensity band position. In case of overlapping intensity bands, the intensity band positions depend on how the positions are determined and differ in particular dependent on whether a maximum value of an intensity band or a geometrical center of gravity of the intensity band is used as the position of the band.

In the mathematical model, the intensity band positions may depend on (in particular already known) refractive indices of a material of a layer to be examined as well as refractive indices of neighboring materials, in particular refractive indices of a base substrate as well as air. For example, the model may include coefficients of reflection that depend on these refractive indices. Interference is caused by light reflection at the upper edge and lower edge of the layer to be examined and has an impact on the measured intensity, and this impact is considered in the model by means of the coefficients of reflection.

As a fit function for the curve fitting in which one or more variables are fit to the measurement data, the mathematical model may in particular comprise a function which fits the intensity band positions or the course of the intensity bands as a function of the actual layer thickness and which thus determines the layer thickness and where applicable further parameters of the layer.

Occasionally the same distance, i.e., the same positional difference between two intensity band positions may result from different layer thicknesses. Such an ambiguity may be ruled out by carrying out several different measurements or by using already known information about the layer in the mathematical model. Using already known information, a possible/allowed layer thickness range may be known, for example. Solutions of the mathematical model are ruled out if a determined layer thickness is outside this layer thickness range. In the case of several measurements for ruling out ambiguities, different light wavelengths may be used, for instance; for unambiguously assigning the positional difference of two intensity band positions to a layer thickness, it may be provided that several measurement graphs are recorded with the light measuring device, wherein the different measurement graphs are recorded with illumination light of different wavelengths; from each measurement graph a respective positional difference of two intensity band positions is determined. As the mathematical model also considers how the positional difference of two intensity band positions depends on the light wavelength, also in this way the number of possible solutions of the mathematical model can be reduced.

If measurements with different wavelengths are carried out, this shall increase the amount of measurement information regarding the same height layers; in contrast to, e.g., the chromatic confocal microscopy, it is not intended to use an optical component/objective with chromatic longitudinal aberration in which case different wavelengths would be focused onto different height layers and thus different height layers would be examined. For avoiding that illumination light of different wavelengths is focused onto different height layers, the confocal microscope may comprise an achromatic or apochromatic objective. Accordingly, it may comprise one or more optical components with chromatic aberration which compensate or partially compensate a chromatic aberration of the remaining optical components of the objectives, in case of an achromat for two distinct wavelengths, in case of an apochromat for a wavelength region, in particular of the illumination light.

A fit function may describe positional differences of two intensity band positions in dependence of the wavelength of the illumination light. By means of the mathematical model, this fit function can be fitted to the positional differences determined at the different wavelengths. The fit function's variable to be fitted may be the layer thickness or another parameter of the layer. This fit function may in particular have a wave form.

In a variant of the described aspect of the invention, also another optical parameter of the layer may be determined in additional or as an alternative to the layer thickness by fitting one or more variables of the mathematical model to the measurement data. For example, the refractive index of the material of the layer may be determined, in particular if the geometrical layer thickness is already known.

Alternatively or additionally to measurement graphs recorded with different light wavelengths, a plurality of measurement graphs may be recorded which differ in another parameter that has an impact on the distance between positions of overlapping intensity bands. For unambiguously assigning the positional difference of two intensity band positions to a layer thickness, different pinhole settings are set for a pinhole of a confocal imaging onto the light measuring device. For each pinhole setting, a respective measurement graph is recorded with the light measuring device. The mathematical model considers a dependence of a positional difference of two intensity band positions on a pinhole setting, wherein knowledge of the different pinhole settings eliminates ambiguities in deducing a layer thickness from positional differences of two intensity band positions. The pinhole settings may comprise different lateral pinhole positions and/or different pinhole sizes.

From the different measurement graphs that differ in their pinhole settings, it is possible to determine a respective positional difference between two intensity band positions. With the mathematical model it is possible to fit a fit function (which describes positional differences between two intensity band positions in dependence on the pinhole setting) to the positional differences determined for the different pinhole settings.

The different settings of the pinhole with which the different measurement graphs have been recorded may be provided in different ways, in particular by:
  a size adjustment of the pinhole between consecutive measurements,
  a lateral displacement of the pinhole between consecutive measurements,
  splitting a beam path of the light coming from the specimen into different beam paths in which different pinholes are arranged, and in particular simultaneously measuring illumination light behind each pinhole, to which end the light measuring device comprises a respective light detector behind each of the pinholes.

The variants of the invention in which different pinhole settings are used may also be combined with measurement methods in which the instrumental requirements for setting different pinholes are already provided or in which it is necessary to perform several measurements with different pinholes. Such a method is the so-called airy scan/sub airy scan. In this method a particularly high lateral resolution is achieved which may be better than the optical resolution limit of the system by measuring the point spread function (PSD) which determines how a specimen point is imaged on a spatially resolving detector. For performing an airy scan, several measurement paths that are laterally separated from each other may be formed in an intermediate image plane or an image plane, i.e., in a beam path of the illumination light coming from the specimen. The laterally separated measurement paths in the intermediate image plane or the image plane may in particular be formed by optical fibers that are laterally offset to each other. Each optical fiber leads to a respective light detector of the light measuring device. The laterally separated measurement paths may also be formed in particular by several sub airy detector elements that are laterally offset to each other. A lateral distance between the laterally offset measurement paths is smaller than a diffraction disc which is the image of a point of the specimen plane imaged into the measurement paths. In this way a specimen point is always imaged onto several measurement paths (simultaneously or consecutively), and taking into calculation the information of these measurement paths leads to a particularly high resolution. In this context, sub airy detector elements shall be understood such that several detector elements neighbor each other close enough so that a distance between the center points of neighboring detector elements is smaller than a diffraction disc as which a specimen point is imaged onto the plane of the detector elements by means of the confocal microscope. The separate signal recording in these measurement paths corresponds to different pinhole settings, i.e., pinholes laterally offset/displaced to each other. The different settings of the pinhole with which the different measurement graphs are recorded may be formed by the laterally separated measurement paths. In other words, measurements with different pinholes are carried out for an airy scan and these different measurements may also be used for the layer thickness determination.

Parameters of the mathematical model which depend on or are defined by the components of the confocal microscope may be initially determined through a reference measurement. In this way the number of unknown parameters can be reduced which are to be determined in the context of the curve fitting to the measurement data. Alternatively, the accuracy of given parameters may be enhanced.

Such parameters may be, for example, a numerical aperture, in particular of an illumination objective, a detection objective or an objective used both for illumination and detection.

The or a reference measurement may in particular comprise the step of recording a measurement graph at a reference specimen which has a layer with a known layer thickness. For the measurement graph the focus plane is adjusted in height relative to the reference specimen so that the measurement graph represents a measurement intensity in dependence on the focused height layer. In the measurement graph, the distance between two (in particular overlapping) intensity band positions may be determined using the mathematical model. In this way, it is possible to determine parameters of the mathematical model which describe how the distance between two intensity band positions depends on the actual, already known layer thickness of the reference specimen.

For automatic examination of unknown specimens, it is useful if the evaluation device is configured to analyze the recorded measurement data not only with regard to a layer thickness but also to verify whether or not a layer/a thin layer exists for which a layer thickness can be determined. For example, in the case of coated wafer, it may be that defect sections are not coated. An uncoated layer is also referred to as a zero-layer system, whereas a layer on a base/substrate is referred to as a one-layer system. For verification whether a one-layer system and not a zero-layer system is present, the evaluation device may be configured to:

carry out a one-layer curve fitting in which the measurement graph is described with two intensity bands,
carry out a zero-layer curve fitting in which the measurement graph is described with a single intensity band, and
assume a one-layer system if a curve fitting result of the one-layer curve fitting has a better quality (smaller deviations) than a curve fitting result with the zero-layer curve fitting.

A curve fitting/function fitting may be understood such that one or more parameters of a function (fit function) which results from the mathematical model is iteratively fitted to the measurement data. The smaller the deviation between the fit function and the measurement data, the better the quality of the result of the curve fitting. A determined value of the layer thickness is only output by the evaluation device if a one-layer system and not a zero-layer system has been assumed.

The described variants of the invention are not limited to a one-layer system but may also be used for examining and describing multiple layer systems. In this case, not two intensity band positions are determined from each measurement graph, but more generally at least two. If the number of layers is known, n+1 intensity band positions may be determined in each measurement graph, wherein n is the number of layers.

Alternatively or additionally to the variants indicated above, for unambiguously assigning the positional difference of two intensity band positions to a layer thickness, also the following method steps may be provided. The evaluation device and/or a control device may be configured to carry out these method steps:

setting different numerical apertures, in particular different numerical apertures for an objective of the confocal microscope, or the numerical aperture for guiding illumination light to the specimen or for guiding illumination light coming from the specimen;
recording for each set numerical aperture a respective measurement graph with the light measuring device; and
wherein the mathematical model describes a dependence of a positional difference of two intensity band positions on the numerical aperture, wherein in particular if the set numerical apertures are known, ambiguities in assigning positional differences of two intensity band positions to a layer thickness are eliminated.

This variant uses that a determined distance between the intensity band positions of overlapping intensity bands also depends on the numerical aperture. If the numerical aperture varies, also the distance between intensity band positions varies. By analyzing several measurement graphs with regard to the distances between two intensity band positions, a layer thickness can be determined more precisely from these several distances.

Besides the layer thickness, also other properties of the specimen or layer may be determined using the mathematical model. In particular, also a surface topology may be determined in addition to the layer thickness by examining several specimen regions/specimen points that are laterally offset/displaced to each other. In particular, the positions of the respective front (first) intensity band from the measurement graphs may be compared with each other to determine a surface topology. Similarly, comparing the positions of the respective rear/back intensity band from the measurement graphs yields a topography of the substrate surface. If a plurality of layers is stacked, a plurality of topographies may be calculated corresponding to the number of intensity band positions.

If a respective layer thickness is determined for each of several specimen points which are laterally offset to each other, an intensity comparison of the measurement graphs recorded for the specimen points allows to determine an extinction map for the specimen points. The extinction map indicates for each specimen point an extinction index or a relative amount of extinction relative to the other specimen points. The extinction of the layer material at a specimen point may thus be assumed to be the higher, the lower the back (second) intensity band is; whereas the front intensity band which is closer to the objective of the illumination light than the back (second) intensity band has a height that is mostly independent from the extinction. The optical components of the confocal microscopes may in particular comprise an objective which serves for illuminating the specimen and also serves for guiding light coming from the specimen to the light measuring device. Alternatively, the optical components may also comprise at least two objectives, one of which is arranged for illumination and the other is arranged for guiding light coming from the specimen.

The focus adjusting device may in principle be any adjustment/actuator device with which a relative position between a focus of the illumination light and the specimen position may be adjusted along the optical axis, i.e., in the propagation direction of the illumination light. To this end, the focus adjusting device may comprise an adjustment device for height adjustment of a specimen holder/a specimen table or an adjustment device for moving or shifting optical components, varying the focus position in z direction, in particular by shifting the objective, shifting certain lenses within the objective or adjusting a zoom optics. For performing a height scan in which the above-referenced measurement graph is recorded, the focus plane is varied over a z measurement range by means of the focus adjusting device while the light measuring device measures corresponding light intensities.

The light measuring device is designed to measure light intensities, in particular of light in the visible, infrared and/or ultraviolet spectral range. The light measuring device may comprise a one-dimensional or two-dimensional camera or may only comprise one or more separate detector elements, for example photomultiplier tubes.

The evaluation device may comprise electronic components which (in particular together with software saved thereon) are configured to carry out the steps mentioned with regard to the evaluation device. In this regard, the evaluation device may also constitute an evaluation and control unit. It may be formed by a computer, for example a personal computer, a laptop or a smartphone, wherein the light measuring device transmits measurement data to the computer and the computer is preferably functionally connected with the other electronic components or control units of the confocal microscope. The computer or the evaluation device may also be distributed (spatially separated) from the other components of the confocal microscope and may be in communication with the other components of the confocal microscope through, for example, a cable, internet or wireless connection.

In contrast to chromatic confocal distance measurements, the imaging system of the invention preferably has no chromatic longitudinal aberration. As a difference to spectrometric measurement methods, each measurement graph may be recorded monochromatically and not with white light.

For a particularly fast specimen examination in which several measurement graphs are recorded with different illumination light wavelengths, it is also possible to illuminate the specimen with white light or simultaneously with different wavelengths; using a color beam splitter, the light coming from the specimen is guided into several different detection channels or measured with a detector/camera having a color resolution. This allows to record several measurement graphs simultaneously which differ in the illumination wavelength.

The measurement and also the curve fitting may be carried out depending on the polarization.

The intended use of the features of the confocal microscope which are described as optional features result in variants of the method of the invention. The evaluation device and/or a control device of the confocal microscope may be configured to carry out the method steps of the described variants of the method of the invention.

Further advantages and features of the invention are described hereinbelow with reference to the attached schematic figures.

Similar components and components with similar effects are, as a general rule, indicated with the same reference signs throughout the figures.

Figure 1:
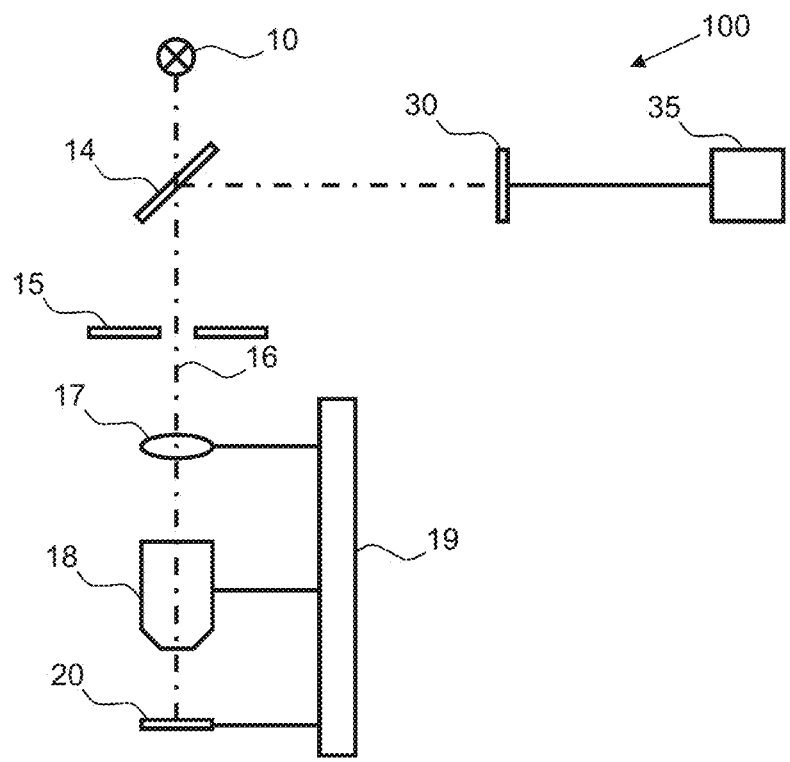
FIG. 1 is a schematic illustration of an exemplary confocal microscope according to the invention.

FIG. 1 shows a schematic perspective view of an exemplary embodiment of a confocal microscope 100 according to the invention in which a layer thickness of a specimen 20 is determined.

The confocal microscope 100 comprises a light source 10, for example one or more lasers, diodes or a white light source. Filters (not depicted) for selecting a certain illumination wavelength may be provided. The confocal microscope 100 may in particular be formed as a laser scanning microscope.

Illumination light of the light source 10 is guided via optical components 17, 18, in particular via an objective 18, to the specimen 20. Light coming from the specimen 20, in the following referred to as specimen light, is detected with a light measuring device 30. The specimen light travels in the depicted example also via the objective 18 and further optical components 17. The specimen light is separated from the illumination light with a beam splitter 14 so that only specimen light and no illumination light is guided to the light measuring device 30. The beam splitter 14 may be a partially transmissive mirror which may in particular either transmit or reflect light dependent on the wavelength or polarization. The specimen light may in particular be illumination light reflected or scattered at the specimen or light that is emitted from the specimen by fluorescence or phosphorescence.

As an alternative to the depicted example in which light is measured which is radiated back or reflected at the specimen, it is also possible to measure transmitted light in which case two objectives are arranged on opposite sides of the specimen 20.

Furthermore, a focus adjusting device 19 is provided for adjusting a focus of the illumination light along the optical axis 16, i.e., in a height direction/z direction/light propagation direction. In addition to the focus adjusting device 19 also a scan device (not depicted) may be provided for a lateral specimen scan, i.e., a scan perpendicular to the optical axis 16.

For a particularly high measurement resolution in the z direction, confocal imaging is used. To this end, a diaphragm/pinhole 15 may be arranged in a plane conjugated with the specimen plane. In this way, substantially only specimen light from the focus plane is allowed to pass the pinhole 15, whereas specimen light from other height layers is substantially blocked.

To determine a layer thickness of the specimen 20, specimen light is measured with the light measuring device 30, while the focus adjusting device 19 changes the illumination focus in the height direction. The measurement data thus recorded is evaluated with an evaluation device 35. This is later described in more detail.

Figure 2:
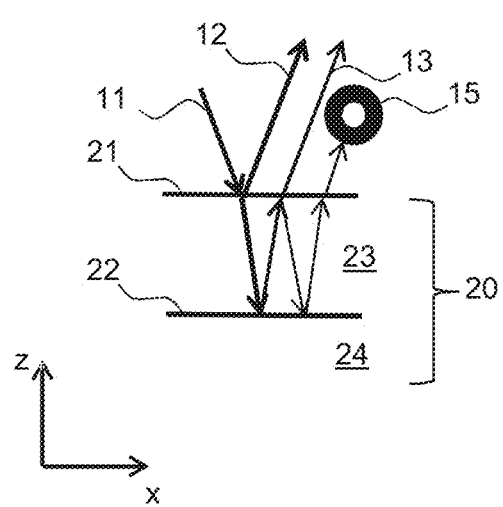
FIG. 2 is a schematic illustration of a light beam path through a specimen layer to be examined.

FIG. 2 shows schematically how illumination light 11 is thrown back at the specimen 20 to be examined. The specimen 20 comprises a layer 23 having a layer thickness to be determined. The layer 23 has an upper edge or upper side 21 which is a border/boundary between the layer 23 and a neighboring medium, for example air. The layer 23 is furthermore limited by a lower edge or lower side 22 at which the layer 23 neighbors another material, for example a base 24. A refractive index of the material of the layer 23 differs from the refractive indices of the neighboring materials. Therefore, a part of the illumination light 11 is reflected at the upper side 21; this reflected light is referenced in FIG. 2 with the numeral 12. Another part of the illumination light 11 is refracted at the upper side 21, runs through the layer 23, is reflected at the lower side 22 and exits the specimen 20 as light portion 13. The light portions 12 and 13 can interfere with each other on the light measuring device. FIG. 2 also shows purely schematically the boundaries of the pinhole 15. An area through which specimen light can travel to the light measuring device is limited by the pinhole 15 in a lateral direction (x direction in FIG. 2) and in the height direction (z direction). Multiple reflections may occur in the specimen layer 23, wherein, depending on the pinhole diameter, the pinhole 15 may block specimen light that has been reflected multiple times, as schematically shown in FIG. 2.

While FIG. 2 shows the variant in which thrown back light 12, 13 is measured, it is alternatively possible to measure light travelling through the specimen 20 and through the lower base material 24. In this case also interferences occur in the detected light, namely between light portions that are refracted at the upper side 21 and refracted at the lower side 22 without being reflected, and light portions that are first refracted at the upper side 21 and are then reflected at the lower side 22 and then again reflected at the upper side 21.

To determine a layer thickness, the focus adjusting device focuses illumination light 11 consecutively onto different height layers. When the focus plane is aligned with (is identical with) the upper edge 21 or the lower edge 22, then the measured intensity of the specimen light is particularly high so that it is possible to determine the distance between the upper edge 21 and the lower edge 22 in a measurement graph showing the measured light intensity in dependence on the z focus position, and this distance can be assumed as a value of the layer thickness.

Figure 3:
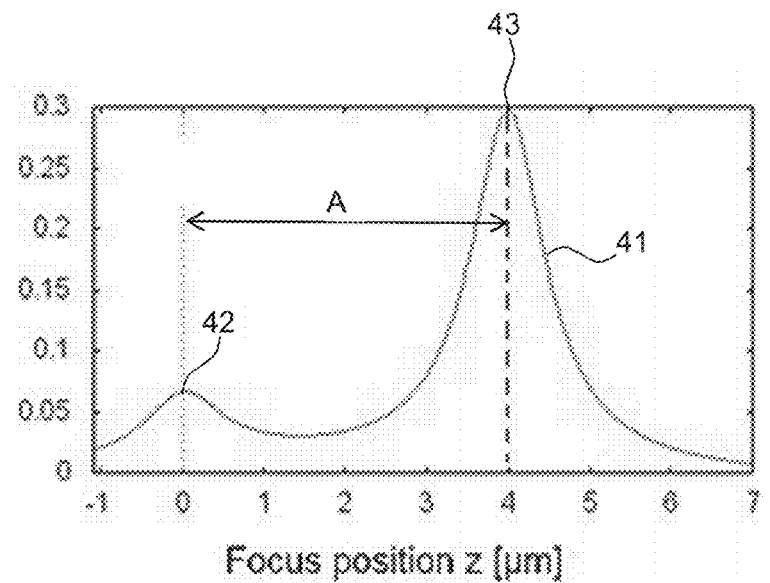
FIG. 3 is a measurement graph showing the light intensity in dependence on the focus height for a thick layer.

FIG. 3 depicts such a measurement graph 41 which shows the measured light intensity (or a quantity that linearly depends on the light intensity, such as a coefficient of reflection) in dependence on the z focus position. It is to be noted that this measurement graph and also the data shown below is mostly simulated data for illustrative purposes. The measurement graph 41 shows two intensity bands or intensity maxima. The first intensity band position 42 corresponds to the case that the z focus position is at the upper side 21 of FIG. 2. The second intensity band position 43 corresponds to the case that the z focus position is at the lower side 22 of FIG. 2. When a setting of the focus adjusting device is changed, it is known how much the z focus position is changed; therefore a distance A between the two intensity band positions 42 and 43 can be determined. In FIG. 3, this distance is 4 µm and is also equal to the actual layer thickness of 4 µm.

In principle the z focus position at which an intensity band has a maximum value can be used as an intensity band position 42 or 43. Usually, however, an intensity band position 42 or 43 is determined through a mean value or geometrical center of gravity of those z focus positions which are within a full width at half maximum of an intensity band, i.e., within an interval of z focus positions, wherein the light intensity at the interval boundaries is half the maximum value of the intensity band.

Figure 4:
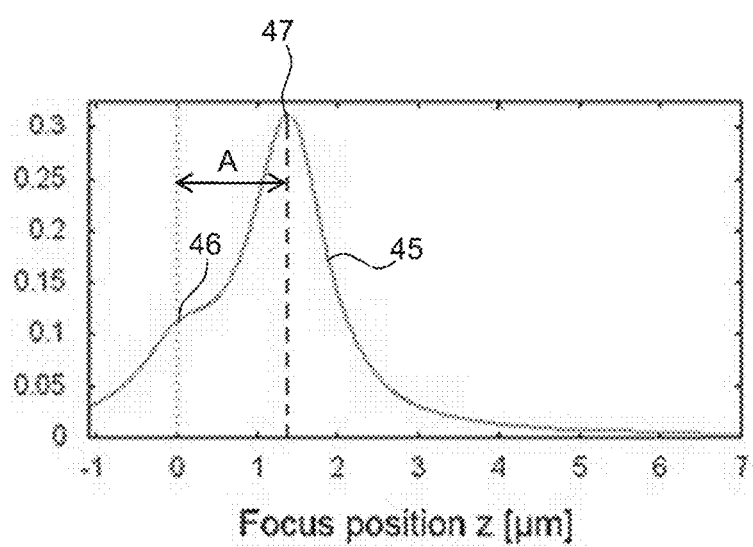
FIG. 4 is a measurement graph showing the light intensity in dependence on the focus height for a thin layer.

Another exemplary measurement graph 45 is shown in FIG. 4. In this case the examined layer is thinner, namely only 1.4 µm. As a consequence, the two intensity bands of measurement graph 45 overlap strongly. The two determined intensity band positions 46 and 47 have in this case, however, not a distance A of exactly 1.4 µm. In the case of overlapping intensity bands, there is rather a shift in the determined intensity band positions 46 and 47 so that their distance A is not exactly equal to the layer thickness. Conventionally, confocal microscopes are thus only used for determination of a layer thickness of thick layers, as shown in FIG. 3, and not for determination of a layer thickness of a thin layer as shown in FIG. 4. In contrast, the invention uses a mathematical model which allows to precisely determine a layer thickness also for a thin layer as shown in FIG. 4.

A layer may be regarded as a thin layer if its thickness is so small that only one maximum and not two local maxima are visible in a measurement graph 45. Accordingly, a classification in thin layers does not only depend on the absolute thickness but also on the measurement system.

A reason for the shift in the determined intensity band positions 46 and 47 is that the overlap of two intensity bands means that a band maximum of the first intensity band is shifted by intensity portions of the second band. The same is true if the above-mentioned geometrical center of gravity is determined instead of the band maximum.

Another reason for the shift of the determined intensity band positions 46 and 47 is the interference between light portions that are reflected at the upper side and lower side of the layer. When illumination light is focused on the upper side, not only light reflected at the upper side is measured but also light that is refracted at the upper side and then reflected at the lower side, as described with reference to FIG. 2. Both positive or negative interference may occur. Depending on this, a distance A of two intensity band positions may either be smaller or larger than an actual layer thickness.

The invention uses a mathematical model which describes a relation or dependency between the determined distance of two intensity band positions and an actual layer thickness. The model considers the above-mentioned interference which influences the intensity band positions. The interference depends on the wavelength of the illumination light which is a given (already known) parameter in the model.

Furthermore, the numerical aperture is part of the model as well as a size of the pinhole. As illustrated in FIG. 2, the diameter of the pinhole 15 affects how illumination light that is multiple times reflected is blocked or transmitted to the light measuring device. Furthermore, the diameter of the pinhole 15 determines the size of an illuminated z focus; at each z focus position, a certain light portion is reflected at the upper side of the layer and is transmitted at the pinhole, and a certain light portion which is reflected at the lower side is transmitted through the pinhole; the amounts of such certain light portions depend on the diameter of the pinhole and are considered in the mathematical model. The size of the pinhole may be measured in airy units. 1 Airy may be defined as the diameter of a diffraction disc onto which a specimen point is imaged with the confocal microscope. Furthermore, a light source point imaged into the specimen layer forms or may form a diffraction disc with a diameter of 1 Airy.

The mathematical model may describe the measured light intensity Int as a function of the z focus position z, i.e., Int[z], wherein Int[z] depends on the sum of the coefficient of reflection $ra_0[z, lambda]$ for a reflection at the upper side and one or more coefficients of reflection $ra_i[d, z, lambda]$ for a reflection at the lower side or for multiple reflections. The coefficients of reflection $ra_0$ and $ra_i$ depend on the z focus position z as well as on the light wavelength lambda. The coefficients of reflection $ra_i$ (for which light runs through the layer) also depend on the actual layer thickness d. In simple mathematical models, the index i of $ra_i$ may be limited to 1 or 2, wherein $ra_i$ describes the case that illumination light is reflected at the lower side 22 of FIG. 2 and then exits the layer at the upper side 21, whereas rat describes the case that illumination light is reflected at the lower side 22, is then reflected at the upper side 21 and is then reflected again at the lower side 22 before it exits the layer at the upper side 21. In the model, the measured light intensity Int[z] may depend on the square of the sum of the coefficients of reflection, for example as defined below, wherein proportionality constants may be supplemented:

$$Int[z]=(ra_0[z,lambda]+ra_i[d,z,lambda])^2.$$

In the mathematical model, the coefficient of reflection $ra_0[z, lambda]$ is described through an expression that considers the focus dimensions in z direction and in lateral directions. This focus dimensions depend on the wavelength, the numerical aperture and the size of the pinhole. A smallest beam diameter (lateral diameter) w0[lambda] may be considered, which is present directly in the focus. In the model, this beam diameter w0[lambda] becomes larger with increasing wavelength lambda, it becomes smaller with increasing numerical aperture NA and it becomes larger with increasing size of the pinhole AU. For example, in the model it may be assumed that:

$$w0[lambda]=AU/4 lambda/NA$$

At other z positions, the beam diameter w[z, lambda] is larger, wherein the model includes an expression which describes the beam diameter w[z, lambda] as a function of z, in particular through w0[lambda] and depending on lambda, AU and NA. For example, it may be assumed that:

$$w[z,lambda]=w0[lambda]*sqrt(1+(z/\pi/(AU/4/NA)^2/lambda)^2)$$

wherein sqrt is the square root of the following expression.

All mentioned equations may in particular be amended such that proportionality factors or constants may be supplemented.

The coefficient of reflection $ra_0[z, lambda]$ may increase with decreasing beam diameter at a specific z position. This considers that in the case of a large beam diameter, a larger portion of reflected light is blocked at the pinhole, whereas with a decreasing beam diameter an increasing portion of the reflected light can pass the pinhole. This can be mathematically expressed in that $ra_0[z, lambda]$ is proportional to, or depends on: w0[lambda]/w[z, lambda].

For example, in the model the coefficient of reflection $ra_0[z, lambda]$ may be described as:

$$ra_0[z,lambda]=rt01[lambda]*w0[lambda]/w[z,lambda]$$

The coefficient rt01[lambda] may result from Fresnel's equation which describes the reflection and transmission of a light wave.

Similarly, the other coefficients of reflection $ra_i[d, z, lambda]$ depend on the beam diameter as well as on the corresponding coefficients according to Fresnel's equations, for example in the following way:

$$ra_i[d,z,lambda]=w0[lambda]/w[z,lambda]*(1-rt01[lambda])^2*rt10[lambda]^(i-1)*rt12[lambda]^i*expterm$$

Here, 1−rt01[lambda] describes the light portion that is transmitted and not reflected at the upper side. The term rt10[lambda] considers the light portion which is reflected at the lower side, and the term rt12[lambda] considers the light portion which is reflected at the lower side and then transmitted at the upper side. The expression expterm describes a wave which may be written as an exponential term with imaginary i as known from Fresnel's equations. The other i in the above equation refer to the index which indicates the number of considered reflections, and may, for example, be set to i=2.

If the illumination wavelength, the numerical aperture NA and the pinhole size AU are known, then w0[lambda] and w[z, lambda] can be calculated and thus also $ra_0$ and $ra_i$ can be calculated, and thus it is possible to finally calculate the intensity Int[z] that can be measured. The data of FIGS. 3 and 4 is simulated in this way, wherein NA=0.6 and lambda=405 nm are assumed in the model, and a layer thickness of d=4 µm is assumed for FIG. 3 and d=1.4 µm is assumed for FIG. 4. If the numerical aperture NA and/or the pinhole diameter AU are unknown, it is also possible to determine these together with the layer thickness d from the measurement data with the help of the mathematical model.

Figure 5:
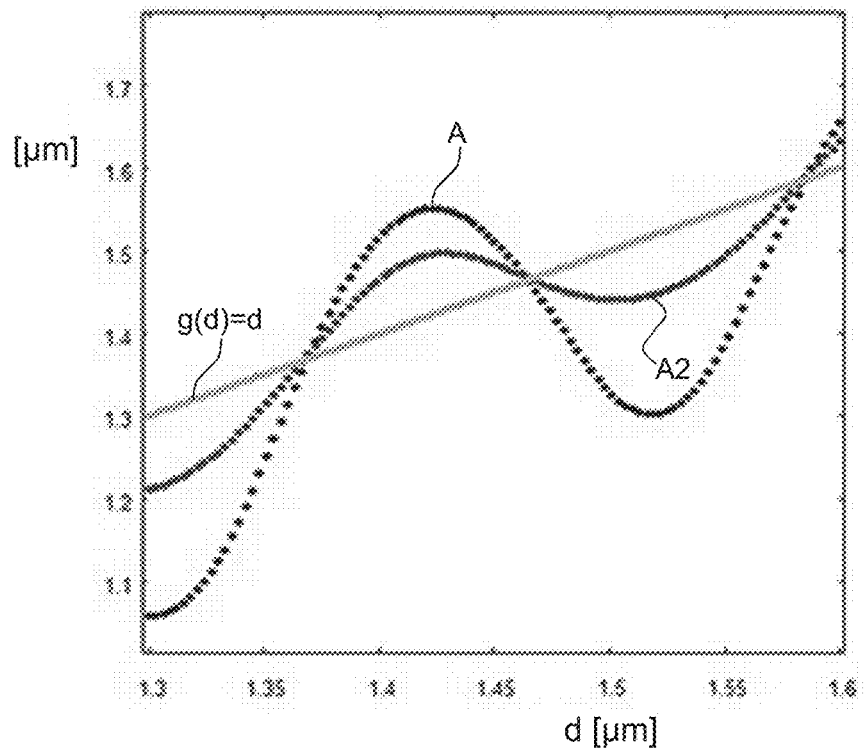
FIG. 5 is an illustration of the relation between the distance of two intensity band positions of the measurement graph of FIG. 4 and the actual layer thickness.

Ideally, it should be possible to unambiguously assign a specific distance A between the intensity band positions of overlapping intensity bands to a layer thickness. However, this is not always the case. FIG. 5 shows a graph in which the determined distance A between two intensity band positions is plotted as a function A(d) of the actual layer thickness d. For comparison, FIG. 5 also includes a line g(d)=d which is equal to the actual (real) layer thickness d. If a specific value of the distance A between two intensity band positions is determined from the measurement data, for example A=1.5 µm, then it is not possible to unambiguously assign this value to a specific actual layer thickness d; in contrast, the case of A=1.5 µm may correspond to the layer thickness d=1.4 µm or d=1.45 µm or d=1.57 µm.

The dependence of the distance A on the actual layer thickness d is in particular affected by the way how the intensity band positions are determined. For the function A, the positions are determined through calculation of the geometrical center of gravity of an intensity band, as described above in more detail. For comparison, FIG. 5 shows another curve A2 which indicates the distance of two intensity band positions in the case that these positions indicate the maximum value of the intensity bands, as also explained in more detail further above. It is apparent from FIG. 5 that it is again not possible to unambiguously assign a specific value of A2 to an actual layer thickness d, wherein the progression of A2($d$) differs significantly from A(d).

These ambiguities can be avoided if additional assumptions are used in the mathematical model. For example, a span of allowed values for the layer thickness d may be predefined so that assigning a value of A to exactly one value of d becomes possible.

Alternatively, it is also possible to perform additional measurements to avoid the ambiguities. To this end at least two measurement graphs, preferably more than two measurement graphs, are recorded in which for the same specimen point (i.e., for the same point in a lateral plane/xy plane) different z focus positions are set with the focus adjusting device, as explained with reference to FIGS. 3 and 4. The plurality of measurement graphs differ in a parameter of the measurement, for example in the wavelength of the illumination light. From each measurement graph, a distance A of the two intensity band positions can be determined. As the shift of the determined intensity band positions depends on the wavelength (as further explained above), different values of the distance A are determined for one specific layer thickness d depending on the wavelength. This is illustrated in FIG. 6 which shows the determined distances as a function of the wavelength of the illumination light.

Figure 6:
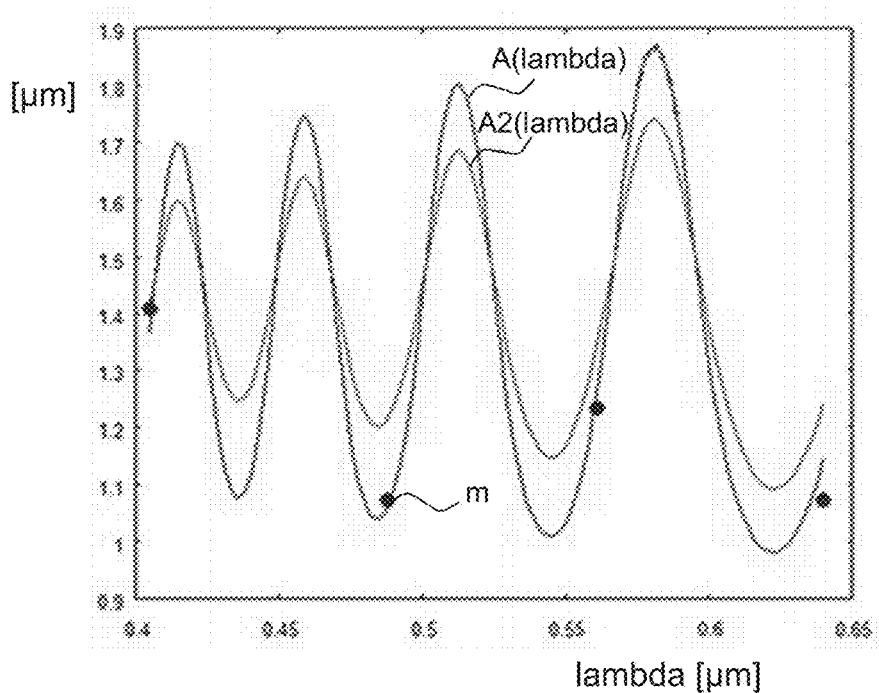
FIG. 6 is a graph of the distance of two intensity band positions of the measurement graph of FIG. 4 in dependence of the wavelength of the illumination light.

FIG. 6 shows experimental data m which indicate the determined distance of two intensity band positions for different illumination wavelengths. Furthermore, two fit functions for these experimental data are shown which use the mathematical model. The first fit function A(lambda) describes the distance A of two intensity band positions for different illumination wavelengths lambda in the case that the intensity band positions are calculated via the geometrical centers of gravity of the intensity bands. The other fit function A2(lambda) describes the distance A of two intensity band positions for different illumination wavelengths lambda in the case that the intensity band positions are determined as location values of the respective maximum values of the intensity bands.

In the depicted example, the curve fitting of A(lambda) yields as results a layer thickness d of 1.44 μm+/−0.045 μm and a numerical aperture of NA=0.4. This calculated layer thickness is larger than each of the experimentally ascertained distances of the intensity band positions in this example which emphasizes the relevance of the procedure of the invention.

Instead of or additionally to changing the illumination wavelength, it is also possible to change another measurement parameter, wherein a respective measurement graph is recorded for each setting of the measurement parameter. For example, it is possible to vary the numerical aperture or a setting (i.e., a size, shape or position) of a pinhole, and to record respective measurement graphs.

Figure 7:
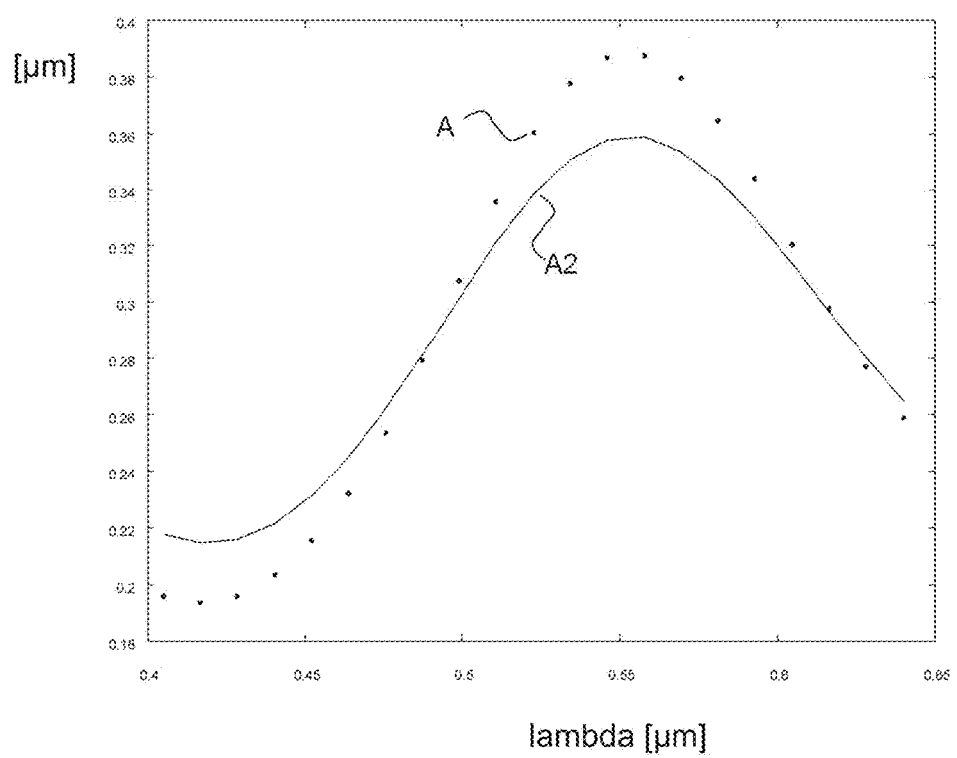
FIG. 7 is a graph of the distance of two intensity band positions in dependence of the illumination wavelength, using a small pinhole diameter.
Figure 8:
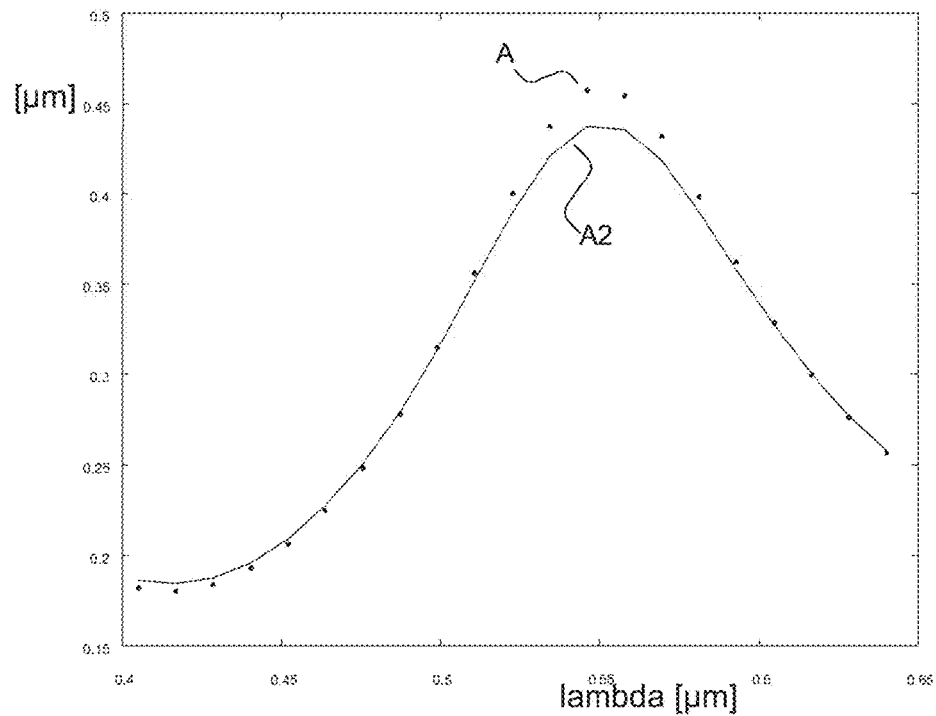
FIG. 8 is a graph of the distance of two intensity band positions in dependence of the illumination wavelength, using a pinhole diameter which is larger than the pinhole diameter used in FIG. 7.
Figure 9:
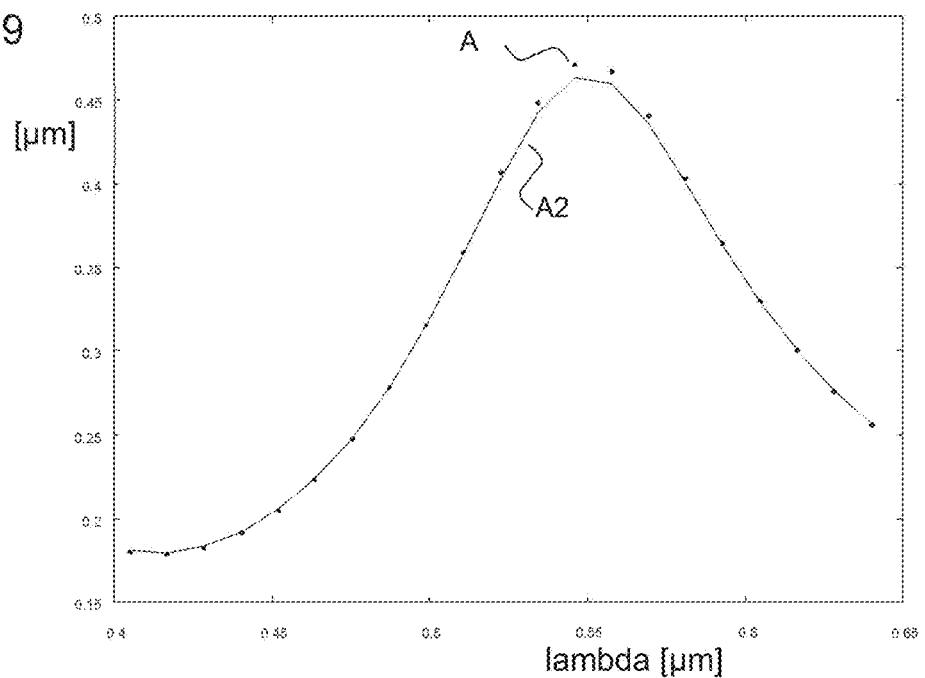
FIG. 9 is a graph of the distance of two intensity band positions in dependence of the illumination wavelength, using a pinhole diameter which is larger than the pinhole diameter used in FIG. 8.

FIGS. 7 to 9 show data simulated with the mathematical model and show the distance A that can be determined between two intensity band positions as a function of the wavelength lambda, similarly to FIG. 6. The values for the distance A were determined by determining the intensity band positions via a geometrical mean value calculation. In contrast, the further shown values of the distance A2 between the intensity band positions were determined by determining the positions of the maximum values of the intensity bands. FIGS. 7 to 9 are each simulated for the same layer thickness of d=273 nm and differ in the size AU of the pinhole of the confocal imaging. In the case of FIG. 7 the diameter of the pinhole is 1.5 Airy Units, i.e. AU=1.5. In contrast, in the case of FIG. 8 is AU=2.5 and for FIG. 9 is AU=3.5. It can be seen that the values of A or A2 for a specific illumination wavelength significantly differ if different pinhole diameters are used. Therefore, in addition or alternatively to varying the illumination wavelength when recording several measurement graphs, it is also possible to vary a pinhole setting. The figures illustrate the significance of the mathematical model for deducing a layer thickness from the distance of two intensity band positions.

Especially in the case of thin layers, only by considering how the distance of two overlapping intensity bands depends on the layer thickness and optionally further quantities, it becomes possible to precisely determine the layer thickness.

The invention thus allows to perform a layer thickness determination for thin layers through confocal microscopy which was hitherto either limited to examination of thicker layers or could only be used for examination of thin layers with significant additional instrumental efforts.

LIST OF REFERENCE SIGNS

10 light source
11 illumination light
12 light portion which is reflected at an upper side of a layer to be examined
13 light portion which runs through a layer to be examined and is then reflected at a lower side of the layer
14 beam splitter
15 pinhole for confocal imaging
16 optical axis
17 optical component(s)
18 optical component/objective
19 focus adjusting device
20 specimen
21 upper side of the layer
22 lower side of the layer
23 layer
24 base
30 light measuring device
35 evaluation device
41 measurement graph showing the light intensity in dependence on the z focus position
42 first intensity band position
43 second intensity band position
45 measurement graph showing the light intensity in dependence on the z focus position
46, 47 intensity band positions
100 confocal microscope
d layer thickness
m experimental data indicating the ascertained distance of two intensity band positions for different illumination wavelengths
A, A(d) distance/positional difference of two intensity band positions
A2, A2($d$) distance/positional difference of two intensity band positions

What is claimed is:

1. A confocal microscope for determination of a layer thickness, comprising:
   optical components for guiding and focusing illumination light onto a specimen;
   a focus adjusting device which is configured to adjust a relative displacement between a focus position of the illumination light and a specimen position along an optical axis of the confocal microscope;

a light measuring device which is arranged for confocal measurement of illumination light coming from the specimen, wherein measurement signals belonging to different settings of the focus adjusting device can be recorded with the light measuring device;

an evaluation device for determining a layer thickness of the specimen, to which purpose the evaluation device is configured to:

determine intensity band positions of at least two intensity bands in a measurement graph recorded by the light measuring device, the measurement graph indicating a measured light intensity in dependence of the focus position, and determine a layer thickness on the basis of a positional difference between the intensity band positions;

wherein the evaluation device is configured to determine the layer thickness using a mathematical model which describes for overlapping intensity bands a dependence of the intensity band positions on at least one light wavelength and the layer thickness, considering interference of the illumination light at the layer.

2. The confocal microscope as defined in claim 1, wherein the evaluation device is configured to determine from a recorded measurement graph, which plots a measured light intensity in dependence of the focus position, a respective intensity band position for a plurality of intensity bands by calculating a geometrical center of gravity from all data within a full width at half maximum of the respective intensity band.

3. The confocal microscope as defined in claim 1, wherein the evaluation device is configured to set in the mathematical model the intensity band positions to depend on refractive indices of a material of a layer to be examined as well as on refractive indices of materials neighboring the layer.

4. The confocal microscope as defined in claim 1, wherein for unambiguously assigning the positional difference of two intensity band positions to a layer thickness, provision is made to record a plurality of measurement graphs with the light measuring device, wherein the different measurement graphs are recorded with illumination light of different wavelengths, and from each measurement graph a respective positional difference of two intensity band positions is determined.

5. The confocal microscope as defined in claim 4, wherein for avoiding that illumination light of different wavelengths is focused on different height layers, the confocal microscope comprises an achromatic or apochromatic objective.

6. The confocal microscope as defined in claim 4, wherein the evaluation device is configured to perform a curve fitting in which, using the mathematical model, a fit function, which describes positional differences of two intensity band positions in dependence of the wavelength of the illumination light, is fitted to positional differences determined for the different wavelengths.

7. The confocal microscope as defined in claim 1, wherein for unambiguously assigning the positional difference of two intensity band positions to a layer thickness, provision is made that different pinhole settings of a pinhole of a confocal imaging onto the light measuring device are set, that for each pinhole setting, a respective measurement graph is recorded with the light measuring device and that the mathematical model describes how a positional difference of two intensity band positions depend on a pinhole setting, wherein by using the knowledge of the different pinhole settings ambiguities in assigning positional differences of two intensity band positions to a layer thickness are ruled out.

8. The confocal microscope as defined in claim 7, wherein from the different measurement graphs, a respective positional difference of two intensity band positions is determined, using the mathematical model, a fit function, which describes positional differences of two intensity band positions in dependence of the pinhole setting, is fit to the positional differences determined with different pinhole settings.

9. The confocal microscope as defined in claim 7, wherein the different settings of the pinhole, through which the different measurement graphs are recorded, are provided by:

a size adjustment of the pinhole between measurements of different measurement graphs, a lateral displacement of the pinhole between measurements of different measurement graphs, splitting a beam path of the light coming from the specimen into different beam paths in which different pinholes are arranged, and measuring illumination light behind each of the pinholes to which end the light measuring device comprises a respective light detector behind each pinhole.

10. The confocal microscope as defined in claim 7, wherein for carrying out an airy scan in an image plane or intermediate image plane, a plurality of measurement paths which are laterally separated from one another are formed, wherein the laterally separated measurement paths are formed in the image plane or intermediate image plane by optical fibers which are laterally spaced from each other, each optical fiber leading to a respective light detector of the light measuring device, or by a plurality of sub airy detector elements that are laterally spaced from each other, wherein a lateral distance between the laterally separated measurement paths is smaller than a diffraction disc formed by imaging a point of a specimen layer onto the measurement paths, the different settings of the pinhole, through which the different measurement graphs are recorded, are formed by the laterally separated measurement paths.

11. The confocal microscope as defined in claim 1, wherein parameters of the mathematical model which depend on components of the confocal microscopes are initially determined through a reference measurement.

12. The confocal microscope as defined in claim 1, wherein for verification whether a one-layer system or a zero-layer system is present:

carrying out a one-layer curve fitting in which the measurement graph is described with two intensity bands, carrying out a zero-layer curve fitting in which the measurement graph is described with a single intensity band, and a one-layer system is assumed if a curve fitting result of the one-layer curve fitting has a better quality than a curve fitting result with the zero-layer curve fitting.

13. The confocal microscope as defined in claim 1, wherein for unambiguously assigning the positional difference between two intensity band positions to a layer thickness:

setting different numerical apertures, recording for each set numerical aperture a respective measurement graph with the light measuring device and wherein the mathematical model describes how a positional difference of two intensity band positions depends on the numerical aperture, wherein knowledge of the set numerical apertures allows to avoid ambiguities in assigning positional differences between two intensity band positions to a layer thickness.

14. A microscopy method for determination of a layer thickness with a confocal microscope, comprising:

guiding illumination light via optical components to a specimen;

adjusting a focus position of the illumination light relative to a specimen position along an optical axis of the confocal microscope by means of a focus adjusting device;

confocally measuring illumination light coming from the specimen by means of a light measuring device, wherein measurement signals belonging to different settings of the focus adjusting device are recorded with the light measuring device;

determining a layer thickness of the specimen by means of an evaluation device, wherein the evaluation device determines intensity band positions of at least two intensity bands from a measurement graph recorded with the light measuring device, wherein the measurement graph indicates a measured light intensity in dependence of the focus position, and wherein the evaluation device determines a layer thickness on the basis of a positional difference between the intensity band positions, wherein the evaluation device determines the layer thickness using a mathematical model which describes for overlapping intensity bands a dependency of intensity band positions on at least a light wavelength and the layer thickness, considering interference of the illumination light at a layer of the specimen.

15. The microscopy method as defined in claim 14, wherein determining a respective layer thickness for each of a plurality of laterally different specimen points, and determining an extinction map of the specimen points by comparing intensities of the measurement graphs recorded for the specimen points.

\* \* \* \* \*